(12) United States Patent
Birnbaum et al.

(10) Patent No.: US 10,887,014 B1
(45) Date of Patent: *Jan. 5, 2021

(54) OPTICAL TRANSCEIVER FOR CONTROLLING STEERING ANGLE BETWEEN RECEIVE LIGHT BEAM AND TRANSMIT LIGHT BEAM

(71) Applicant: Facebook, Inc., Menlo Park, CA (US)

(72) Inventors: Kevin Michael Birnbaum, Reseda, CA (US); Harvard Keese Harding, Jr., Simi Valley, CA (US); Eric Douglas Miller, Sherman Oaks, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/379,020

(22) Filed: Apr. 9, 2019

Related U.S. Application Data

(63) Continuation of application No. 15/995,457, filed on Jun. 1, 2018, now Pat. No. 10,298,325.

(60) Provisional application No. 62/649,496, filed on Mar. 28, 2018.

(51) Int. Cl.
*H04B 10/112* (2013.01)
*H04B 10/50* (2013.01)
*G02B 26/08* (2006.01)
*H04B 10/40* (2013.01)
*G02B 27/28* (2006.01)

(52) U.S. Cl.
CPC ..... *H04B 10/1123* (2013.01); *G02B 26/0808* (2013.01); *G02B 26/0891* (2013.01); *G02B 27/286* (2013.01); *H04B 10/40* (2013.01); *H04B 10/503* (2013.01)

(58) Field of Classification Search
CPC .. H04B 10/1123; H04B 10/40; H04B 10/503; G02B 26/0808; G02B 26/0891; G02B 27/286

See application file for complete search history.

(56) References Cited

U.S. PATENT DOCUMENTS

| | | | |
|---|---|---|---|
| 6,359,712 B1 * | 3/2002 | Kamitani | H04B 10/1143 398/118 |
| 6,819,815 B1 * | 11/2004 | Corbalis | G02B 6/3588 385/16 |
| 9,723,386 B1 * | 8/2017 | Ni | H04Q 11/0066 |
| 2002/0109884 A1 * | 8/2002 | Presley | H04B 10/1125 398/121 |

(Continued)

*Primary Examiner* — Mina M Shalaby
(74) *Attorney, Agent, or Firm* — Fenwick & West LLP

(57) ABSTRACT

An optical transceiver for controlling a steering angle between a receive light beam and a transmit light beam includes an optical beam coupling device. The optical beam coupling device comprises a plurality of optical elements configured to control a steering angle between the receive light beam received by the optical beam coupling device along a first line of sight (LOS) and the transmit light beam that is output from the optical beam coupling device along a second LOS different from the first LOS, wherein both the receive light beam and the transmit light beam pass through the plurality of optical elements. The plurality of optical elements have a set of combinations for different positions of each of the optical elements, wherein each position in the set of combinations induces a different steering angle between the transmit light beam and the receive light beam.

16 Claims, 7 Drawing Sheets

(56) References Cited

U.S. PATENT DOCUMENTS

| | | | | |
|---|---|---|---|---|
| 2003/0103716 | A1* | 6/2003 | Capik | G02B 6/3588 |
| | | | | 385/17 |
| 2008/0291950 | A1* | 11/2008 | McCallion | G02B 26/0883 |
| | | | | 372/20 |
| 2012/0219252 | A1* | 8/2012 | Marom | G02B 6/3556 |
| | | | | 385/16 |
| 2012/0257902 | A1* | 10/2012 | Deng | G02B 5/3083 |
| | | | | 398/152 |
| 2012/0292482 | A1* | 11/2012 | Cook | G01S 7/481 |
| | | | | 250/206.1 |
| 2012/0314286 | A1* | 12/2012 | Chuang | G02B 27/281 |
| | | | | 359/489.08 |
| 2013/0241762 | A1* | 9/2013 | Smith | G01S 17/42 |
| | | | | 342/54 |
| 2013/0315604 | A1* | 11/2013 | LoPresti | H04B 10/1123 |
| | | | | 398/116 |
| 2015/0378186 | A1* | 12/2015 | Xiong | G02F 1/093 |
| | | | | 359/484.04 |
| 2016/0294472 | A1* | 10/2016 | Palmer | H04B 10/116 |
| 2016/0365698 | A1* | 12/2016 | Borthwick | H01S 3/08054 |
| 2017/0288784 | A1* | 10/2017 | Li | G02B 26/10 |
| 2017/0359123 | A1* | 12/2017 | Fontaine | H04J 14/06 |
| 2018/0041279 | A1* | 2/2018 | Segura | H04B 10/1129 |
| 2018/0172915 | A1* | 6/2018 | Kim | H04B 10/1125 |
| 2019/0075281 | A1* | 3/2019 | Hall | G02F 1/1393 |
| 2019/0078858 | A1* | 3/2019 | Miller | |
| 2019/0081703 | A1* | 3/2019 | Miller | H04B 10/116 |

* cited by examiner

500

```
┌─────────────────────────────────────────────────────────────────────┐
│                                                                     │
│   Determine a steering angle from a range of possible steering angles │
│                                 510                                 │
│                                                                     │
└─────────────────────────────────────────────────────────────────────┘
                                    │
                                    ▼
┌─────────────────────────────────────────────────────────────────────┐
│                                                                     │
│  Adjust a steering angle between a receive light beam and a transmit light beam │
│                      to the determined steering angle               │
│                                 520                                 │
│                                                                     │
└─────────────────────────────────────────────────────────────────────┘
```

OPTICAL TRANSCEIVER FOR CONTROLLING STEERING ANGLE BETWEEN RECEIVE LIGHT BEAM AND TRANSMIT LIGHT BEAM

CROSS-REFERENCE TO RELATED APPLICATIONS

This application is a continuation of U.S. application Ser. No. 15/995,457, filed Jun. 1, 2018, which claims benefit of U.S. Provisional Patent Application Ser. No. 62/649,496, filed Mar. 28, 2018, which are hereby incorporated by reference in their entirety.

BACKGROUND

The present disclosure generally relates to a laser communication system, and specifically relates to an optical transceiver for controlling a steering angle between a receive light beam and a transmit light beam.

Laser-based systems, such as laser communication systems, commonly employ multiple laser beams. A bidirectional laser communication system (e.g., in space settings) can include two or more laser terminals (e.g., either stationary or non-stationary terminals) that communicate between each other by encoding information into light beams. To exchange information data between two laser terminals of the laser communication system, each laser terminal transmits a light beam with encoded data to another laser terminal and receives another light beam with encoded data transmitted from the other laser terminal.

If a relative velocity between the laser terminals is low (e.g., below a threshold velocity), the light beam transmitted from the laser terminal and other light beam received from the other light terminal are substantially aligned along the same line of sight (LOS). On the other hand, if the relative velocity between the laser terminals is above the threshold velocity (which often happens in ground-space and space-to-space terminal communications), the relativistic effect needs to be accounted for when the laser terminals communicate between each other. Therefore, for accurate communication between the laser terminals, it is required to differentiate between a position of the other laser terminal relative to the laser terminal when a light beam is received from the other light terminal and another future position of the other laser terminal relative to the laser terminal for directing another light beam toward the other light terminal. Typically, the light beam received from the other laser terminal and the other light beam transmitted to the other light terminal are not parallel to each other. Instead, from the perspective of the laser terminal, there is a certain differential (point-ahead) angle between transmit and receive light beams.

The conventional approach is to implement two very precise separate pointing systems at the laser terminal. A first pointing system (e.g., receiving pointing system) is required to direct the receive light beam toward a detector of the laser terminal. A second pointing system (e.g., transmitting pointing system) implemented separately from the first pointing system needs to be configured to provide a differential (point-ahead) angle to send the transmit light beam to the other laser terminal accounting for a relative velocity and separation between the laser terminals. Accordingly, the conventional approach is relatively complex, as it uses two separate pointing systems to accurately align transmit and receive light beams that must be precisely aligned to each other.

SUMMARY

An optical transceiver for controlling a steering angle between a receive light beam and a transmit light beam is presented herein. The optical transceiver may be implemented as part of a laser terminal of a laser communication system that communicates with another (remote) laser terminal. The optical transceiver comprises an optical beam coupling device that includes a plurality of optical elements. The optical elements are configured to control a steering angle between the receive light beam received by the optical beam coupling device along a first line of sight (LOS) and the transmit light beam that is output from the optical beam coupling device along a second LOS different from the first LOS. Both the receive light beam and the transmit light beam pass through the plurality of optical elements. The plurality of optical elements have a set of combinations for different positions of each of the optical elements, wherein each position in the set of combinations induces a different steering angle between the transmit light beam and the receive light beam. In some embodiments, the optical transceiver further comprises a controller coupled to the optical beam coupling device. The controller estimates a point-ahead angle between the first LOS and the second LOS, and controls a position of each of the plurality of optical elements to steer at least one of the transmit light beam and the receive light beam relative to each other, based on the estimated point-ahead angle.

BRIEF DESCRIPTION OF THE DRAWINGS

FIG. 5 is a flow chart illustrating a process of controlling a steering angle between a receive light beam and a transmit light beam, which may be implemented at the laser terminal shown in FIG. 2A, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

The teachings described herein may be used in laser communication systems. The teachings herein may be incorporated into (e.g., implemented within or performed by) laser terminals of a laser communication system. The laser terminals of the laser communication system communicate between each other using laser beams, i.e., light beams.

Figure 1:
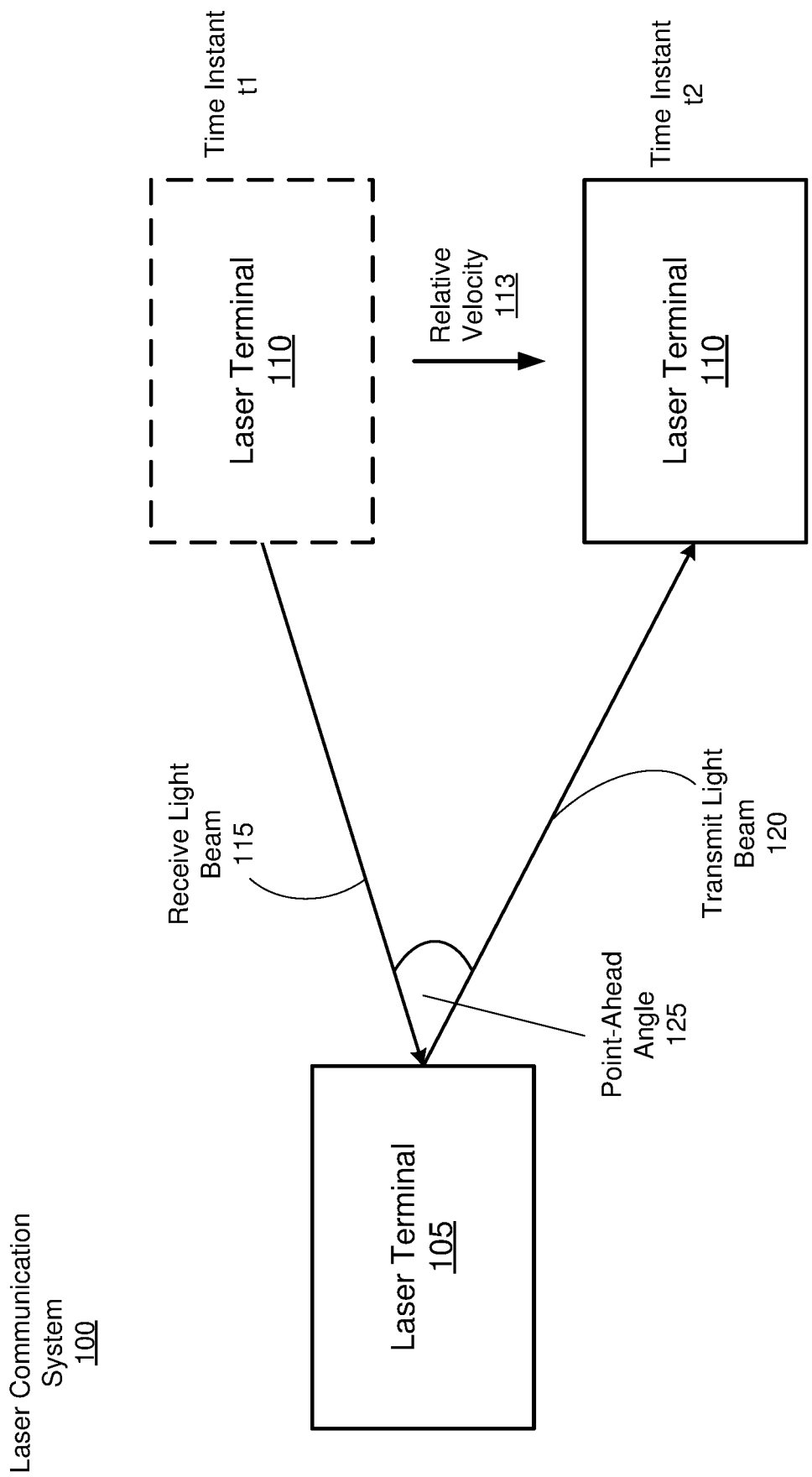
FIG. 1 is an example laser communication system comprising two communicating laser terminals, in accordance with one or more embodiments.

FIG. 1 is an example laser communication system 100 comprising two laser terminals 105, 110 that communicate with each other using light beams, in accordance with one or more embodiments. In some embodiments, the laser communication system 100 is a ground-space communication system, e.g., the laser terminal 105 may be a stationary laser terminal located on the Earth and the laser terminal 110 may be a non-stationary laser terminal placed on a satellite orbiting the Earth. In some other embodiments, the laser communication system 100 is a space-to-space communication system, i.e., both laser terminals 105, 110 are located in space, e.g., located on different satellites orbiting the Earth. In general, at least one of the laser terminals 105, 110 is a non-stationary laser terminal, and there is a certain relative velocity between the laser terminal 105 and the laser terminal 110. In some embodiments, the laser terminals 105, 110 are far apart from each other, and the laser terminals 105, 110 have high velocities relative to each other, e.g., above a threshold velocity. Because of that, there is a certain differential (point-ahead) angle between a light beam transmitted from each laser terminal 105, 110 and another light beam received by that laser terminal 105, 110.

In the illustrative embodiment of FIG. 1, the laser terminal 105 is shown as a stationary laser terminal, whereas the laser terminal 110 is shown as a non-stationary laser terminal. However, both laser terminals 105, 110 can be non-stationary laser terminals. As shown in FIG. 1, there is a relative velocity 113 between the laser terminal 105 and the laser terminal 110. At a time instant $t_1$, the laser terminal 110 may be at a first position relative to the laser terminal 105. The laser terminal 105 receives a receive light beam 115 transmitted from the laser terminal 110 at the time instant $t_1$. At some other time instant $t_2$ in the future, the laser terminal 110 will be at a new second position relative to the laser terminal 105, wherein the second relative position is based on the relative velocity 113. The laser terminal 105 needs to account for changing of relative positions between the laser terminal 105 and the laser terminal 110 when sending a light beam to the laser terminal 110. Thus, the laser terminal 110 outputs a transmit light beam 120 toward a future relative position of the laser terminal 110, i.e., the laser terminal 105 steers the transmit light beam 120 from the receive light beam 115 by a certain differential (point-ahead) angle 125. In other words, the receive light beam 115 is received by the laser terminal along a first line of sight (LOS) and the transmit light beam 120 is output from the laser terminal 105 along a second LOS different from the first LOS. The difference between the first LOS and the second LOS is referred to as the point-ahead angle 125. Note that the point-ahead angle 125 may be a function of the relative velocity 113 and a distance between the laser terminals 105, 110. The point-ahead angle 125 can be referred to herein as a steering angle.

An optical transceiver presented in this disclosure for implementation in a laser terminal (e.g., in any of the laser terminals 105, 110) allows for precise control of a steering angle between a transmit light beam and a receive light beam. An optical beam coupling device for the optical transceiver represents a single mode fiber device that induces a specific steering angle between the transmit light beam and the receive light beam. Unlike two separate optical assemblies in conventional laser terminals, the optical beam coupling device presented herein provides a single optical assembly that is used by both the transmit light beam and the receive light beam. The optical beam coupling device includes a plurality of optical elements to induce differential steering between transmit and receive beams, thereby allowing dynamic control of a point-ahead angle using the single optical assembly. In some embodiments, the optical elements of the optical beam coupling device may be, e.g., compound prisms, wedges, diffraction gratings, or some combination thereof. Wavelengths and/or polarization of light may be used to differentiate between transmit and receive light beams, as disclosed in more detail in conjunction with FIGS. 3A-3B, FIG. 4.

Figure 2A:
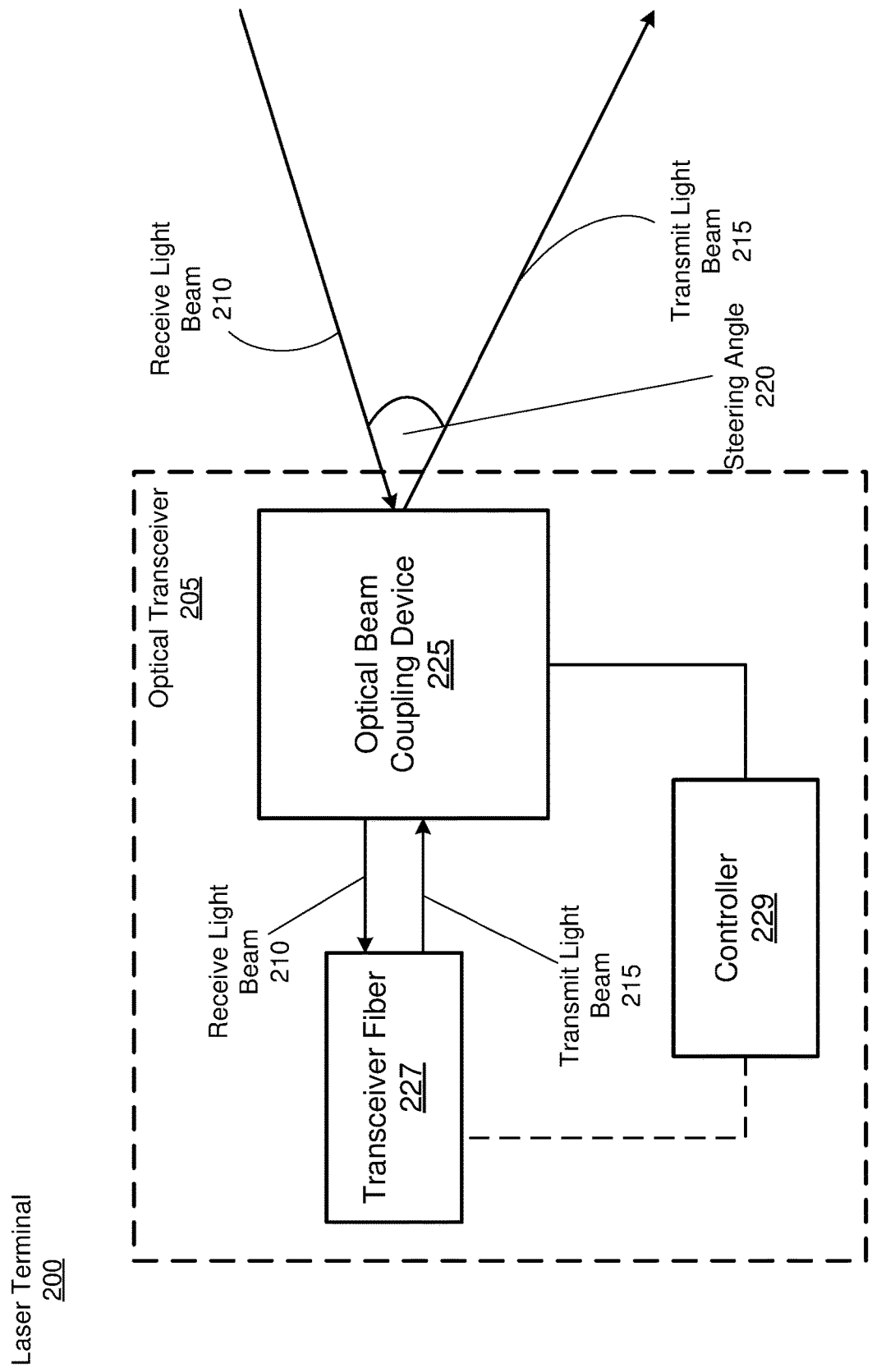
FIG. 2A is a laser terminal including an optical transceiver for controlling a steering angle between a receive light beam and a transmit light beam, in accordance with one or more embodiments.

FIG. 2A is an example laser terminal 200 including an optical transceiver 205 for controlling a steering angle between a receive light beam 210 received by the optical transceiver 205 and a transmit light beam 215 output by the optical transceiver 205, in accordance with one or more embodiments. The laser terminal 200 may be an embodiment of the laser terminal 105 of FIG. 1. The optical transceiver 205 is configured to in-couple the receive light beam 210 transmitted from another laser terminal (not shown in FIG. 2A) and to out-couple the transmit light beam 215 to the other laser terminal, by inducing a steering angle 220 between the receive light beam 210 and the transmit light beam 215 to account for a relative velocity between the laser terminal 200 and the other laser terminal. The optical transceiver 205 includes an optical beam coupling device 225 coupled to a transceiver fiber 227, and a controller 235 coupled to the optical beam coupling device 225.

The optical beam coupling device 225 is a single optical assembly used by both the receive light beam 210 and the transmit light beam 215 to induce a specific steering angle 220 (i.e., point-ahead angle) between the receive light beam 210 and the transmit light beam 215. The optical beam coupling device 225 includes a plurality of optical elements configured to induce differential steering between the receive and transmit light beams 210, 215. More details about structure and operation of the optical beam coupling device 225 are disclosed in conjunction with the FIGS. 2B, 3A-3B, FIG. 4.

The transceiver fiber 227 is coupled to the optical beam coupling device 225. The transceiver fiber 227 may be configured to provide the transmit light beam 215 that is being passed to the optical beam coupling device 225 for differential steering. The transceiver fiber 227 may be further configured to in-couple the receive light beam 210 being differentially steered by the optical beam coupling device 225. In some embodiments, the transceiver fiber 227 includes a detector for sensing an intensity signal associated with the receive light beam 210.

The controller 229 may be coupled to at least one optical element of the plurality of optical elements of the optical beam coupling device 225, e.g., via one or more positioners (not shown in FIG. 2A). The controller 229 may control a position of the at least one optical element of the optical beam coupling device 225 to achieve a specific steering angle 220 between the receive light beam 210 and the transmit light beams 215. The controller 229 may estimate a point-ahead angle (i.e., steering angle 220) between a first LOS along which the receive light beam 210 was received by the optical beam coupling device 225 and a second LOS along which the transmit light beam 215 will be output from the optical beam coupling device 225. The controller 229 may estimate the point-ahead angle based on, e.g., a relative velocity between the laser terminal 200 and the other laser terminal and a distance between the laser terminal 200 and the other laser terminal. The controller 229 may control a position of the at least one optical element of the optical beam coupling device 225 to steer at least one of the transmit light beam 215 and the receive light beam 210 relative to each other, based on the estimated point-ahead angle.

In some embodiments, the transceiver fiber 227 includes a fiber tap (not shown in FIG. 2A) for monitoring a power associated with the receive light beam 210. Information about the power of receive light beam 210 may be provided to the controller 229 interfaced with the transceiver fiber 227. The controller 229 may adjust the steering angle 220, based on the information about power. If the power starts to fall off (e.g., the power is below a threshold level), the controller 229 adjusts the steering angle 220 to bring the power back up. Alternatively, instead of the fiber tap, the optical transceiver includes a beam-splitter (not shown in FIG. 2A) that splits of a defined amount of power from the receive light beam 210 (e.g., 5%, or some other amount that depends on a signal strength of the receive light beam 210). Then, the controller 229 coupled to the beam-splitter may be configured to directly measure the split off power before the receive light beam 210 is coupled into the transceiver fiber 227, and to adjust accordingly the steering angle 220.

Figure 2B:
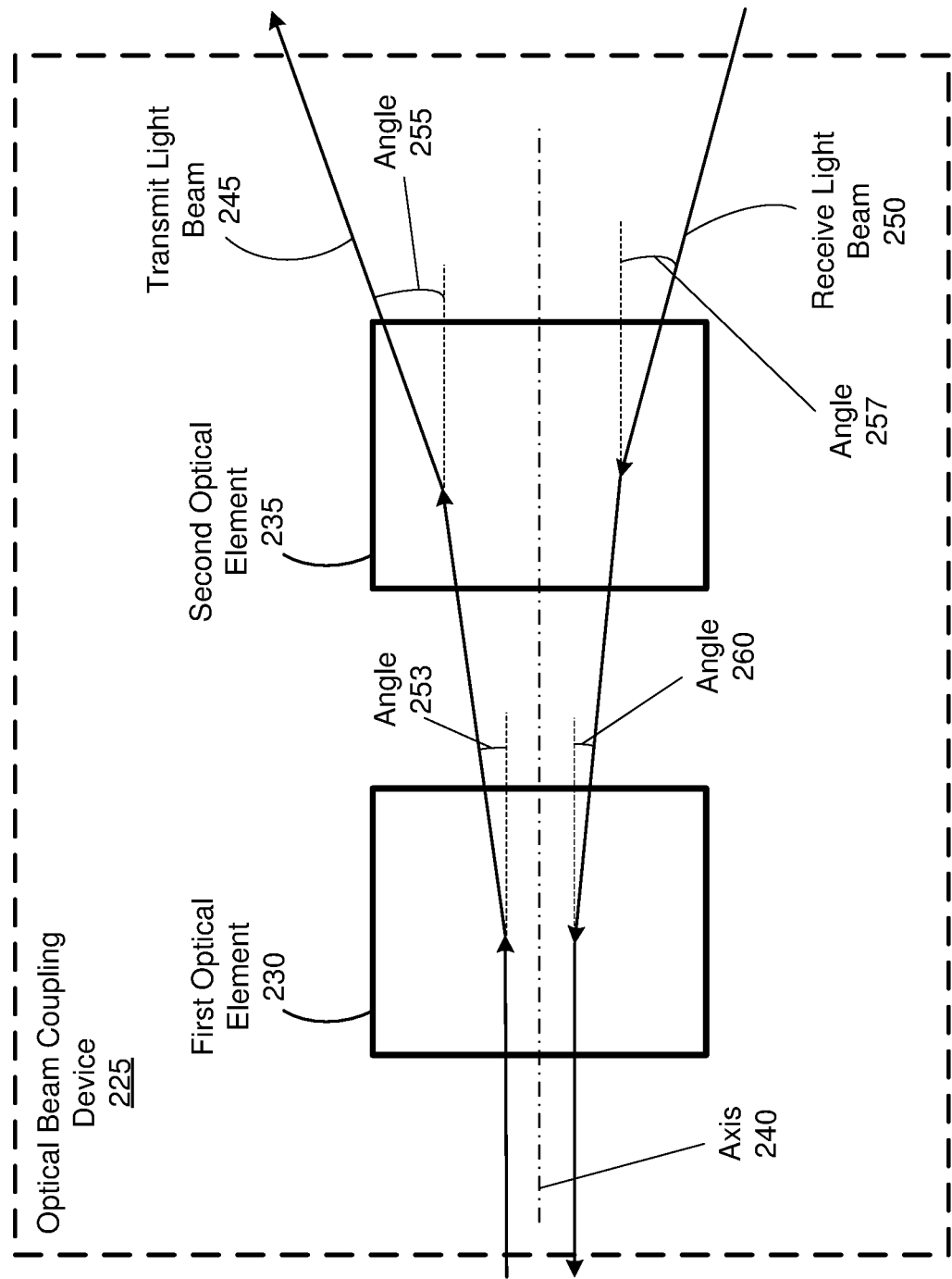
FIG. 2B is an example of an optical beam coupling device of the optical transceiver of FIG. 2A having a plurality of optical elements, in accordance with one or more embodiments.

FIG. 2B illustrates the optical beam coupling device 225 of FIG. 2A having a plurality of optical elements, in accordance with one or more embodiments. In the illustrative embodiment shown in FIG. 2B, the optical beam coupling device 225 includes a first optical element 230 coupled to a second optical element 235. Although not shown in FIG. 2B, the optical beam coupling device 225 may include one or more additional optical elements coupled to the first and second optical elements 230, 235. Each optical element 230, 235 is configured to refract an incident light beam by a steering angle of a variable amount relative to an optical axis 240. A steering angle provided by that optical element 230, 235 may depend on a structure of incident light (e.g., wavelength, polarization) and a structure of that optical element 230, 235 (e.g., refraction index of at least one material used for implementation of that optical element 230, 235). Note that refraction of light can also refer in this disclosure to deflection of light, steering of light, or diffraction of light.

As shown in FIG. 2B, the first optical element 230 of the optical beam coupling device 225 is configured to steer a transmit light beam 245 relative to the axis 240 by an angle 253, and the second optical element 235 is configured to steer the transmit light beam 245 relative to the axis 240 by an angle 255. Thus, the transmit light beam 245 is output from the optical beam coupling device 225 as a light beam steered from the original direction parallel to the axis 240 by an angle equal to the sum of steering angles provided by the first and second optical elements 230, 235, e.g., by the sum of the angles 253 and 255. Similarly, the second optical element 235 is configured to steer a receive light beam 250 relative to the axis 240 by an angle 257, and the first optical element 230 is configured to steer the receive light beam 250 relative to the axis 240 by the angle 260. Thus, the receive light beam 250 is steered by the optical beam coupling device 225 by an angle equal to the sum of steering angles provided by the first and second optical elements 230, 235, e.g., the sum of the angles 257 and 260. Thus, the receive light beam 250 is received by the optical beam coupling device 225 along a first LOS, and the transmit light beam 245 is output from the optical beam coupling device 255 along a second LOS different from the first LOS. Both the receive light beam 250 and the transmit light beam 245 pass through the first and second optical elements 230, 235.

At least one of the first and second optical elements 230, 235 can change position (e.g., nominally rotate) relative to the axis 240 to dynamically adjust a steering angle provided by the at least one of the first and second optical elements 230, 235. In this manner, different steering angles between transmit and receive light beams can be achieved. In some embodiments, as discussed, the controller 235 is configured to control a position of the at least one of the optical elements 230, 235 to steer at least one of the transmit light beam and the receive light beam relative to each other, based on a known point-ahead angle. The first optical element 230 and the second optical element 235 have a set of combinations for different positions of each of the first and second optical elements 230, 235. Each position in the set of combinations may induce a different steering angle between the transmit light beam 245 and the receive light beam 250.

Figure 3A:
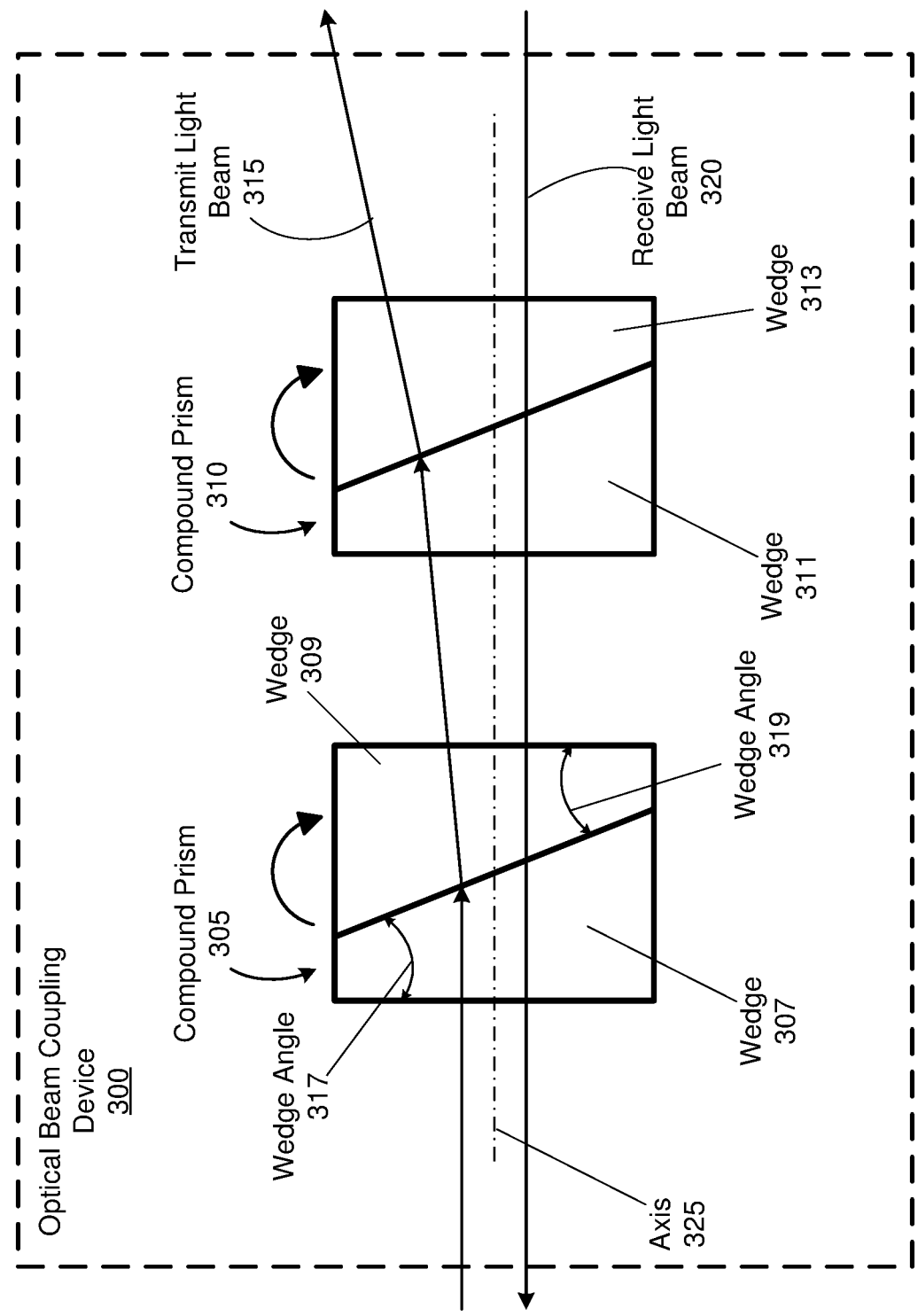
FIG. 3A is an example of an optical beam coupling device of the optical transceiver of FIG. 2A implemented using a pair of compound prisms, in accordance with one or more embodiments.

In some embodiments, each of the first and second optical elements 230, 235 of the optical beam coupling device 225 are implemented as a compound prism. FIG. 3A is an example of an optical beam coupling device 300 implemented using a pair of compound prisms 305, 310, in accordance with one or more embodiments. The optical beam coupling device 300 may be an embodiment of the optical beam coupling device 225 of the optical transceiver 205 from FIG. 2A; and the compound prisms 305, 310 may be embodiments of the first and second optical elements 230, 235. Although not shown in FIG. 3A, the optical beam coupling device 300 may include one or more additional compound prisms coupled to the compound prisms 305, 310. A compound prism is an optical assembly comprising at least a pair of optical elements attached to each other (e.g., prisms or wedges) configured to refract an incident light beam by an angle that depends on a structure of light (e.g., wavelength, polarization) and a structure of each optical element in the compound prism (e.g., refraction index of a material of each optical element in the compound prism).

As shown in FIG. 3A, each compound prism 305, 310 is composed of a pair of wedges attached to each other, i.e., the compound prism 305 includes a wedge 307 attached to a wedge 309 and the compound prism 310 includes a wedge 311 attached to a wedge 313. The wedges 307, 309 of the compound prism 305 are attached to each other such that the wedges 307, 309 cannot move relative to each other. Similarly, the wedges 311, 313 of the compound prism 310 cannot move relative to each other. In the illustrative embodiment of FIG. 3A, each compound prism 305, 310 steers a transmit light beam 315 of a first wavelength without affecting propagation of a receive light beam 320 of a second wavelength different from the first wavelength. In general, each compound prism 305, 310 refracts (steers) the transmit light beam 315 by a first angle and refracts (steers) the receive light beam 320 by a second angle relative to an axis 325, wherein wavelengths of the transmit light beam 315 and the receive light beam 320 are different. Thus, as result, the receive light beam 320 is received by the optical beam coupling device 300 along a first LOS, and the transmit light beam 315 is output from the optical beam coupling device 300 along a second LOS different from the first LOS. Both the receive light beam 320 and the transmit light beam 315 pass through the compound prisms 305, 310.

Note that, in conventional systems, Risley prisms can be used for steering of monochromatic beams, wherein two or more prisms are rotated around a direction of light propagation. The achromatized Risley prisms can be used for steering wideband light beams incident to the Risley prisms, i.e., for steering of light beams having different waveleghts. A compound prism composed of, e.g., a pair of Risley prisms is designed to minimize differential steering between the incident light beams of different wavelengths. In general, the compound prism made of Risley prisms provides a fixed angle between two incident light beams of different wavelengths independent of position of the compound prism relative to a direction of light propagation. In contrast, compound prisms presented in this disclosure (e.g., the compound prisms 305, 310) dynamically change a steering angle between a pair of light beams of different wavelengths, based on different positions of the compound prisms relative to a direction of light propagation (e.g., the axis 325).

Figure 3B:
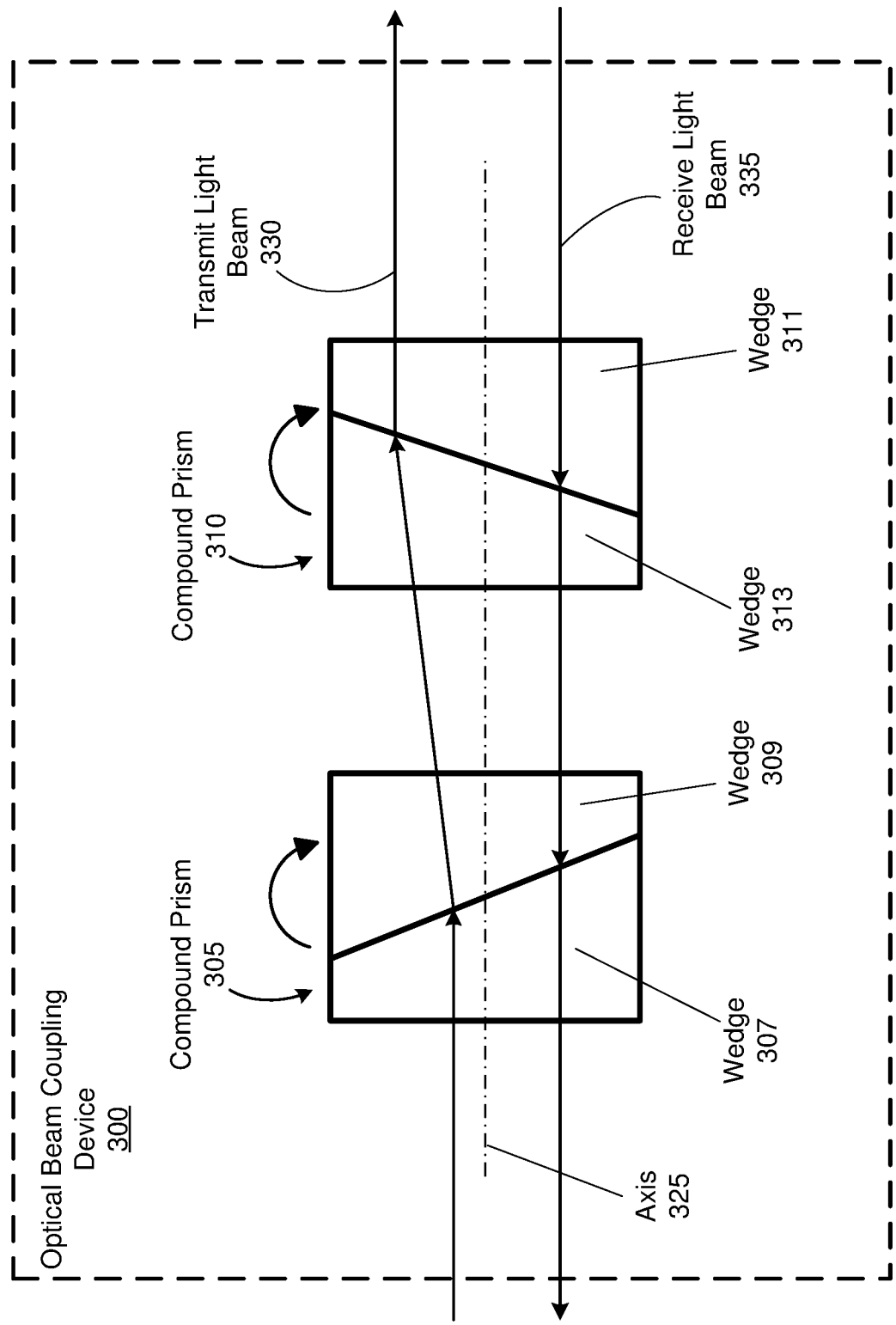
FIG. 3B is another example of an optical beam coupling device of the optical transceiver of FIG. 2A implemented using a pair of compound prisms, in accordance with one or more embodiments.

At least one of the compound prisms 305, 310 can be rotated around the axis 325 to dynamically adjust a steering angle between the transmit light beam 315 and the receive light beam 320. FIG. 3B illustrates another example of the optical beam coupling device 300 where the compound prism 310 was rotated around the axis 325 by 180°. As shown in FIG. 3B, a receive light beam 335 is not affected by either compound prism 305 or compound prism 310 and propagates straight through (e.g., same as the receive light beam 320 in FIG. 3A). On the other hand, a transmit light beam 330 is deflected upward by the compound prism 305 (e.g., same as the transmit light beam 315 in FIG. 3A). But, the transmit light beam 330 is then deflected downward by the compound prism 310, ending up being parallel to the axis 325 and the receive light beam 335.

Note that by rotating at least one of the compound prisms 305, 310, changes in both a magnitude and a direction of desired point-ahead angle can be achieved. FIGS. 3A-3B show that the optical beam coupling device 300 can produce various magnitudes of the point-ahead angle by rotating one compound prism relative to the other. For example, in FIG. 3A where both compound prisms 305, 310 are oriented identically relative to the axis 325, deflection of the transmit light beam 315 is twice the deflection of a single compound prism. On the other hand, in FIG. 3B where the compound prisms 305, 310 are oppositely oriented relative to the axis 325, the total deflection of the transmit light beam 330 is zero. A direction of the point-ahead angle can be also controlled by rotating both compound prisms 305, 310 together. For example, if both compound prisms 305, 310 were rotated 180 degrees about the axis 325 relative to their positions in FIG. 3A, then the transmit light beam 330 would be deflected downward when exiting the optical beam coupling device 300 in FIG. 3B.

In some embodiments, the wedges 307, 309 of the compound prism 305 are implemented using different uniform materials. Similarly, the wedges 311, 313 of the compound prism 305 can be implemented using different uniforms material. In one or more embodiments, the wedges 307, 311 are implemented using a first uniform material, e.g., SF6G05 material; and the wedges 309, 313 are implemented using a second uniform material different from the first uniform material, e.g., fused silica material. The first uniform material (e.g., SF6G05 material) and the second uniform material (e.g., fused silica material) may have different dispersions. For example, the combination of SF6G05 and fused silica materials in each of the compound prisms 305, 310 acts as a refractive prism that allows light of 1.53 um wavelength to propagate through the compound prisms 305, 310 without any refraction, whereas light of 1.565 um is refracted by the compound prisms 305, 310 by the total of approximately 51 uRad. In this embodiment, a wedge angle 317 of the wedge 307 (e.g., SF6G05 prism) is approximately 14.56 degrees and a wedge angle 319 of the wedge 309 (e.g., fused silica prism) is approximately 25.73 degrees. In this embodiment, the compound prisms 305, 310 are identical, i.e., the compound prisms 305, 310 are implemented using the same materials and their corresponding wedge angles are same. Furthermore, three compound prisms having combination of SF6G05 and fused silica materials can cover a field-of-view of +/−150 uRad in point-ahead angle.

Referring back to FIG. 2B, in some embodiments, at least one of the first optical element 230 and the second optical element 235 is a compound optical element implemented using gradient-index materials of wedged shapes. Thus, for example, the wedge 307 of the compound prism 305 and/or the wedge 311 of the compound prism 310 may be implemented using a first gradient-index material, and the wedge 309 of the compound prism 305 and/or the wedge 313 of the compound prism 310 may be implemented using a second gradient-index material different from the first gradient-index material. In some other embodiments, at least one of the first optical element 230 and the second optical element 235 is a compound optical element implemented using gradient-index materials of flat shapes. In some other embodiments, at least one of the first optical element 230 and the second optical element 235 is a single optical element implemented using gradient-index materials of wedged shape. In some other embodiments, at least one of the first optical element 230 and the second optical element 235 is a single optical element implemented using gradient-index materials of flat shape.

In some embodiments, instead of prisms of wedged shape (wedges), at least one of the first optical element 230 and the second optical element 235 is a compound optical element that includes a pair of diffraction gratings for diffraction of incident light. In one or more embodiments, the diffraction gratings of the at least one of the first optical element 230 and the second optical element 235 can be implemented as transmissive gratings. In one embodiment, each diffraction grating of the first optical element 230 (or the second optical element 235) can be implemented as a ruled holographic surface. In another embodiment, each diffraction grating of the first optical element 230 (or the second optical element 235) can be implemented as a holographic volume, e.g., volume Bragg. In some embodiments when diffraction gratings are used instead of wedges in the first optical element 230 and/or the second optical element 235, some level of spatial filtering can be implemented to block diffracted light of higher diffraction orders as well as undiffracted light. Additionally or alternatively, the diffraction gratings of the first optical element 230 (and/or the second optical element 235) can be blazed to increase efficiency so that most of an optical power is concentrated in a specific diffraction order. In some other embodiments, the first optical element 230 is implemented as a compound prism having a pair of wedges (e.g., the compound prism 305 having the wedges 307, 309), and the second optical element 235 is implemented as a compound optical element that includes a pair of diffraction gratings. In some other embodiments, at least one of the first optical element 230 and the second optical element 235 is implemented as a compound optical element that includes a prism attached to a diffraction grating, e.g., a grism.

In some embodiments, differential steering between transmit and receive light beams can be achieved based on polarization of light, instead of a wavelength of light. Accordingly, the optical beam coupling device 225 of FIG. 2B may further includes a pair of quarter-waveplates, wherein each quarter-waveplate is positioned adjacent to a different one of the first and second optical elements 230, 235. A quarter-waveplate is an optical element that shifts polarization of received light. A quarter-waveplate includes a polarization axis and the quarter-waveplate shifts the polarization axis 45 degrees relative to incident linearly polarized light such that the quarter-waveplate converts linearly polarized light into circularly polarized light. Likewise, a quarter-waveplate converts circularly polarized light incident to the quarter-waveplate into linearly polarized light. Quarter-waveplates can be made of birefringent materials such as quartz, organic material sheets, or liquid crystal.

Figure 4:
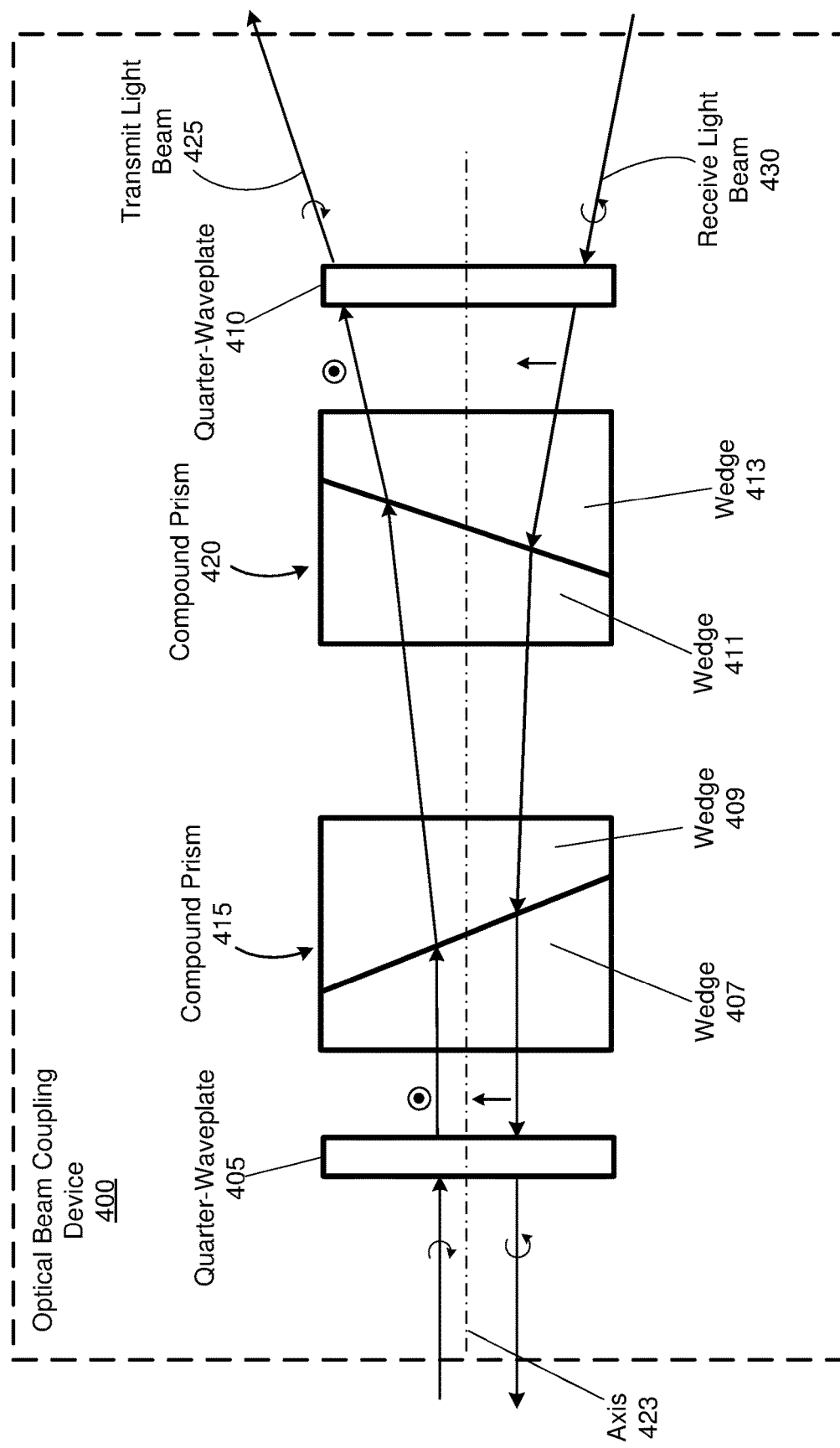
FIG. 4 is an example of an optical beam coupling device of the optical transceiver of FIG. 2A implemented using a pair of quarter-waveplates coupled to a pair of compound prisms, in accordance with one or more embodiments.

FIG. 4 is an example of an optical beam coupling device 400 implemented using a pair of quarter-waveplates 405, 410 coupled to a pair of compound prisms 415, 420, in accordance with one or more embodiments. The optical beam coupling device 400 may be an embodiment of the optical beam coupling device 225. The quarter-waveplate 405 may be configured to change its position relative to an axis 423 together with the compound prism 415. Similarly, the quarter-waveplate 410 may be configured to change it position relative to the axis 423 together with the compound prism 420. In some embodiments, the quarter-waveplate 405 is bonded to the compound prism 415, i.e., there is no air space between the quarter-waveplate 405 and the compound prism 415. Similarly, the quarter-waveplate 410 may be bonded to the compound prism 420, i.e., there is no air space between the quarter-waveplate 410 and the compound prism 420.

Note that a transmit light beam 425 entering the optical beam coupling device 400 comprises circularly polarized light of a first handedness (e.g., right handed circularly polarized light), and a receive light beam 430 entering the optical beam coupling device 400 comprises circularly polarized light of a second handedness different from the first handedness (e.g., left handed circularly polarized light). The quarter-waveplate 405 may convert the transmit light beam 425 entering the optical beam coupling device 400 from circularly polarized light of the first handedness into linearly polarized light of a first polarization (e.g., polarized along x dimension). The quarter-waveplate 410 may convert the transmit light beam 425 of the first linear polarization back to the circularly polarized light of the first handedness that is output from the optical beam coupling device 400. Similarly, the quarter-waveplate 410 may convert the receive light beam 430 entering the optical beam coupling device 400 from circularly polarized light of the second handedness into linearly polarized light of a second polarization orthogonal to the first polarization (e.g., polarized along y dimension). The quarter-waveplate 405 may convert the receive light beam 430 of the second linear polarization back to the circularly polarized light of the second handedness before being in-coupled by a receive fiber (not shown in FIG. 4).

The compound prism 415 may include a pair of wedges 407, 409 implemented using birefringent materials for steering linearly polarized incident light by a specific angle depending on a direction of linear polarization of the incident light. For example, the wedge 407 may be implemented using a first birefringent material, and the wedge 409 may be implemented using a second birefringent material. Alternatively, one of the wedges 407, 409 is implemented using a birefringent material, and the other one of the wedges 407, 409 is implemented using a non-birefringent material. Similarly, the compound prism 420 may include a pair of wedges 411, 413 implemented using same or different birefringent materials for steering linearly polarized incident light by a specific angle depending on a direction of linear polarization of the incident light. For example, the wedge 411 may be implemented using a third birefringent material (which may be same as the first or second birefringent material), and the wedge 413 may be implemented using a fourth birefringent material (which may be same as the first or second birefringent material). Alternatively, one of the wedges 411, 413 is implemented using a birefringent material, and the other one of the wedges 411, 413 is implemented using a non-birefringent material.

In general, the compound prisms 415 and 420 are made of birefringent materials that deflect (steer) the transmit light beam 425 and the receive light beam 430 though different angles. In some embodiments, each of the compound prisms 415 and 420 can be configured to functionally operate as the Wollaston prism, Rochon prism, Senarmont prism, Nomarski prism, etc. The birefringent material used for implementation of the compound prisms 415 and 420 can be e.g., calcite, quartz, sapphire, some other material, or some combination thereof. When the compound prisms 415 and 420 are made of uniaxial birefringent materials, the c-axis of crystals can be oriented perpendicular to direction of light propagation (beam direction). The axis direction (i.e., rotation about the propagation direction) for each compound prism 415, 420 (and relative to each other) is dependent on the specific design and polarization direction of incoming light, i.e., the transmit and receive light beams 425, 430. Thus, as result, the receive light beam 430 is received by the optical beam coupling device 400 along a first LOS, and the transmit light beam 425 is output from the optical beam coupling device 400 along a second LOS different from the first LOS.

In some embodiments, the optical beam coupling device 400 is implemented without the quarter-waveplates 405, 410. In this case, the wedges 407, 409 of the compound prism 415 and the wedges 411, 413 of the compound prism 420 are implemented using circularly-birefringent materials for steering circularly polarized incident light by a specific angle depending of a handedness of the circularly polarized incident light. Alternatively, instead of using the compound prisms 415, 420 made of wedges, the optical beam coupling device 400 can be implemented using compound optical elements based on Bragg polarization gratings. Thus, referring back to FIG. 2B, each of the first and second optical elements 230, 235 may be implemented using a pair of Bragg polarization gratings.

In some embodiments (not shown in FIG. 4), instead of the quarter-waveplates 405, 410, the optical beam coupling device 400 includes a pair of half-waveplates, i.e., the quarter-waveplate 405 is replaced by a first half-waveplate and the quarter-waveplate 410 is replaced by a second half-waveplate. A half-waveplate is an optical element that shifts polarization of incident light. A half-waveplate includes a polarization axis and the half-waveplate shifts the polarization axis 90 degrees relative to incident polarized light. Half-waveplates can be made of birefringent materials such as quartz, organic material sheets, or liquid crystal. Both transmit and receive light beams entering the optical beam coupling device 400 including the half-waveplates include linearly polarized light, e.g., along directions orthogonal to each other.

In some embodiments, a transmit light beam entering the optical beam coupling device 400 having the pair of half-waveplates instead of the pair of quarter-waveplates 405, 410 comprises light linearly polarized along a first direction. A receive light beam entering the same optical beam coupling device 400 comprises light linearly polarized along a second direction orthogonal to the first direction. The half-waveplates may change position (e.g., rotate) independently of the compound prisms 415, 420 in order to line up polarizations of the transmit and receive light beams to birefringent axes of the compound prisms 415, 420. The transmit and receive light beams pass through the compound prisms 415, 420 without a change in their polarization. However, the transmit and receive light beams are deflected by the compound prisms 415, 420 by different angles because of a specific birefringence of each of the compound prisms 415, 420.

In some other embodiments (not shown in FIG. 4), the optical beam coupling device 400 further includes a pair of quarter-waveplates having fixed positions relative to the axis 423. A first of the fixed position quarter-waveplates may convert polarization of a transmit light beam entering the optical beam coupling device 400 from linear to circular of a first handedness. Similarly, a second of the quarter-waveplates may convert polarization of a receive light beam entering the optical beam coupling device from linear to circular of a second handedness different from the first handedness. Any of the aforementioned approaches using polarization light can be then used in combination with the fixed position quarter-waveplates.

FIG. 5 is a flow chart illustrating a process 500 of controlling a steering angle between a receive light beam and a transmit light beam, which may be implemented at the laser terminal 200 shown in FIG. 2A, in accordance with one or more embodiments. The process 500 of FIG. 5 may be performed by the components of the optical transceiver 205 implemented at the laser terminal 200. Other entities may perform some or all of the steps of the process in other embodiments. Likewise, embodiments may include different and/or additional steps, or perform the steps in different orders.

The optical transceiver determines 510 (e.g., via a controller) a steering angle from a range of possible steering angles. In some embodiments, the optical transceiver determines the steering angle from calculation based on relative changes in position, velocity, etc. between a laser terminal comprising the optical transceiver and another laser terminals. In one or more embodiments, the optical transceiver determines the steering angle from power reading related to the receive light beam in-coupled by the optical transceiver.

The optical transceiver adjusts 520 (e.g., via the controller) a steering angle between the receive light beam and the transmit light beam to the determined steering angle. Both the receive light beam and the transmit light beam may pass through a plurality of optical elements of an optical beam coupling device included into the optical transceiver. The plurality of optical elements have a set of combinations for different positions of each of the optical elements, wherein each position in the set of combinations induces a different steering angle between the transmit light beam and the receive light beam. The optical transceiver controls (e.g., via the controller) a position of each of the plurality of optical elements to adjust the steering angle to the determined steering angle. The optical transceiver controls (e.g., via the controller) positions of a pair of waveplates to adjust the steering angle to the determined steering angle, each waveplate in the pair positioned adjacent to a different one of the plurality of optical elements.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An optical beam coupling device of a first apparatus, the optical beam coupling device comprising:
   a plurality of optical elements, wherein only a pair of identical compound prisms of the plurality of optical elements is configured to control a steering angle between a first light beam and a second light beam, the first light beam generated by a second apparatus and received by the optical beam coupling device, the second light beam generated by the first apparatus and output from the optical beam coupling device toward the second apparatus, each of the compound prisms comprising a pair of wedges, and
   the pair of identical compound prisms having a set of combinations for different positions of each of the pair of identical compound prisms, each position in the set of combinations inducing a different steering angle between the first light beam and the second light beam.

2. The optical beam coupling device of claim 1, wherein a compound prism of the pair of identical compound prisms is configured to steer by a first angle the first light beam having a first wavelength and to steer by a second angle the second light beam having a second wavelength different from the first wavelength.

3. The optical beam coupling device of claim 1, wherein the wedges in each compound prism are attached to each other.

4. The optical beam coupling device of claim 1, wherein each wedge in the pair of wedges is implemented using a different material.

5. The optical beam coupling device of claim 1, wherein each compound prism is implemented using a gradient-index material.

6. The optical beam coupling device of claim 1, further comprising a pair of quarter-waveplates, each quarter-waveplate in the pair of quarter-waveplates positioned adjacent to a different one of the pair of identical compound prisms.

7. The optical beam coupling device of claim 6, wherein:
the first light beam entering the optical beam coupling device comprises circularly polarized light of a first handedness; and
the second light beam entering the optical beam coupling device comprises circularly polarized light of a second handedness different from the first handedness.

8. The optical beam coupling device of claim 6, wherein each quarter-waveplate is bonded to one of the pair of identical compound prisms adjacent to that quarter-waveplate.

9. The optical beam coupling device of claim 1, wherein each compound prism comprises a compound optical element implemented using a birefringent material.

10. The optical beam coupling device of claim 1, wherein:
the pair of wedges in each compound prism are implemented using circularly-birefringent materials;
the first light beam entering the optical beam coupling device comprises circularly polarized light of a first handedness; and
the second light beam entering the optical beam coupling device comprises circularly polarized light of a second handedness different from the first handedness.

11. The optical beam coupling device of claim 1, wherein:
the optical beam coupling device further includes a pair of half-waveplates, each half-waveplate in the pair of half-waveplates positioned adjacent to a different one of the pair of identical compound prisms;
the first light beam entering the optical beam coupling device comprises light linearly polarized along a first direction; and
the second light beam entering the optical beam coupling device comprises light linearly polarized along a second direction orthogonal to the first direction.

12. The optical beam coupling device of claim 11, wherein each half-waveplate changes a position independently from a corresponding adjacent compound prism.

13. The optical beam coupling device of claim 1, further comprising a pair of quarter-waveplates having fixed positions relative to an axis, wherein:
a first of the quarter-waveplates converts polarization of the first light beam entering the optical beam coupling device from linear to circular of a first handedness, and
a second of the quarter-waveplates converts polarization of the second light beam entering the optical beam coupling device from linear to circular of a second handedness different from the first handedness.

14. A method of a first apparatus, the method comprising:
determining an angle for steering from a range of possible steering angles; and
controlling a position of at least one compound prism of a pair of identical compound prisms of the first apparatus to adjust a steering angle between a first light beam and a second light beam to the determined steering angle, wherein
the first light beam generated by a second apparatus and received by the pair of identical compound prisms, the second light beam generated by the first apparatus and output from the pair of identical compound prisms toward the second apparatus, each of the compound prisms comprising a pair of wedges, the first apparatus comprising a plurality of optical elements, and only the pair of identical compound prisms of the plurality of optical elements is configured to control the steering angle.

15. The method of claim 14, wherein:
the first light beam and the second light beam pass through the pair of identical compound prisms in opposite directions; and
the pair of compound prisms having a set of combinations for different positions of each of the pair of identical compound prisms, each position in the set of combinations inducing a different steering angle between the first light beam and the second light beam.

16. The method of claim 14, further comprising:
controlling positions of a pair of waveplates to adjust the steering angle to the determined steering angle, each waveplate in the pair of waveplates positioned adjacent to a different one of the pair of identical compound prisms.

* * * * *